(12) United States Patent
Carpenter

(10) Patent No.: US 7,897,294 B2
(45) Date of Patent: Mar. 1, 2011

(54) NANO-MATERIAL CATALYST DEVICE

(75) Inventor: Ray Douglas Carpenter, Tustin, CA (US)

(73) Assignee: Quantumsphere, Inc., Santa Ana, CA (US)

(*) Notice: Subject to any disclaimer, the term of this patent is extended or adjusted under 35 U.S.C. 154(b) by 822 days.

(21) Appl. No.: 10/983,993

(22) Filed: Nov. 8, 2004

(65) Prior Publication Data

US 2006/0269823 A1    Nov. 30, 2006

(51) Int. Cl.
H01M 4/02 (2006.01)
H01M 4/88 (2006.01)

(52) U.S. Cl. .................. 429/533; 429/523; 502/101

(58) Field of Classification Search .................. 429/40, 429/41, 44, 45
See application file for complete search history.

(56) References Cited

U.S. PATENT DOCUMENTS

| | | | |
|---|---|---|---|
| 3,627,790 A * | 12/1971 | Stiles | 552/265 |
| 4,202,744 A | 5/1980 | Pan et al. | |
| 4,401,529 A | 8/1983 | Gray | |
| 6,533,919 B1 | 3/2003 | Narayanan et al. | |
| 6,569,518 B2 * | 5/2003 | Yadav et al. | 428/323 |
| 6,585,931 B1 | 7/2003 | Kweon et al. | |
| 6,596,187 B2 | 7/2003 | Coll et al. | |
| 2003/0027033 A1 | 2/2003 | Seabaugh et al. | |
| 2003/0038034 A1 | 2/2003 | Griego et al. | |
| 2003/0183080 A1 | 10/2003 | Mundschau | |
| 2003/0186109 A1 * | 10/2003 | Huang et al. | 429/44 |
| 2003/0203139 A1 | 10/2003 | Ren et al. | |
| 2003/0217928 A1 | 11/2003 | Lin et al. | |
| 2004/0245681 A1 * | 12/2004 | Dieterle et al. | 266/171 |

OTHER PUBLICATIONS

Starz, K.A. et al. "Advanced Catalyst Systems for Mobile PEMFC Applications—The Challenge of Carbon Monoxide" *Society of Automotive Engineers, Inc.*, 2000-01-0013, pp. 147-152.
"Fuel Cell Background Information" *The Alternative Fuels Program at Kettering University.* 11pp. Online. Internet. Sep. 15, 2004.

* cited by examiner

*Primary Examiner*—Patrick Ryan
*Assistant Examiner*—Muhammad Siddiquee
(74) *Attorney, Agent, or Firm*—Knobbe, Martens, Olson & Bear, LLP

(57) ABSTRACT

A catalyst member can comprise nano-scale nickel particles. The catalyst member can be used for a plurality of different uses, for example, electrodes of a fuel cell or an electrolysis device. The nano-scale nickel particles can be sintered or combined in other manners to form the desired shape.

3 Claims, 7 Drawing Sheets

NANO-MATERIAL CATALYST DEVICE

BACKGROUND OF THE INVENTION

1. Field of the Invention

The inventions disclosed herein generally relate to catalysts for dissociation of hydrogen, for example, catalysts used in fuel cells as electrodes for promoting the dissociation of electrons from hydrogen molecules and the association of electrons with protons.

2. Description of the Related Art

Fuel cells are presently used to convert hydrogen rich fuel into electricity without combusting the fuel. For example, methanol, propane, and similar fuels that are rich in hydrogen and/or pure hydrogen gas fuel cell systems have been developed which generate electricity from the migration of the hydrogen in those fuels across a membrane. Because these fuels are not burned, pollution from such fuel cells is quite low or non-existent.

These fuel cells are generally more than twice as efficient as gasoline engines because they run cooler without the need for insulation and structural reinforcement. Additionally, some fuels such as methanol, are relatively inexpensive.

A single "cell" of a hydrogen-type fuel cell system or "fuel cell stack" usually consists a single electrolyte sandwiched between electrodes. This sandwich is disposed between current collectors which usually serve as the poles (i.e., the anode and cathode) of the cell.

Such a fuel cell generates current by transforming or dissociating (usually by using the catalyst in the electrodes) hydrogen gas into a mixture of hydrogen ions and electrons with a catalyst on the anode side of the cell. Because of the insulating nature of the electrolyte, the ions transfer through the electrolyte to the cathode side of the cell while the electrons are conducted to the current collectors and through a load to do work. The electrons then travel to the cathode side current collector where they disperse onto the electrodes to combine with incoming hydrogen ions, oxygen, or air in the presence of a catalyst to form water completing the circuit. This process occurs in many types of fuel cells, including for example, but without limitation, alkaline, solid polymer, phosphoric acid and solid oxide fuel cells.

Recently, the solid polymer membrane fuel cell has become the focus of much attention. A broad spectrum of industries, including automotive and power utilities, are now developing solid polymer membrane fuel cells for use with hydrogen fuels.

The cost of certain components of the solid polymer membrane fuel cell systems, as well as other factors, has slowed the commercialization of these systems. For example, the cost of platinum used for the catalyst of the modern solid polymer membrane fuel cell remains as a barrier to the production of low cost fuel cell systems.

SUMMARY OF THE INVENTION

An aspect of at least one of the embodiments disclosed herein includes the realization that a catalyst device providing about the same performance of a platinum catalyst device can be manufactured with other less expensive materials by using nano-scale particles of such less expensive materials. In modern solid polymer membrane fuel cells, platinum is the primary ingredient in the catalyst devices because platinum has a high surface energy density. However, platinum is costly. Thus, the cost of such catalyst devices, and thus fuel cell systems, as well as other systems using platinum catalysts, can be reduced by using other less expensive materials that are configured to provide about the same effective total surface energy as modern platinum catalyst devices.

In accordance with at least one of the embodiments disclosed herein, a fuel cell configured to generate electrical energy from reactions of a gaseous fuel and air comprises a proton exchange membrane and at least first and second catalyst members. The catalyst members are disposed on opposite sides of the proton exchange membrane. The first and second catalyst members comprise sintered nano-scale nickel particles.

In accordance with another embodiment, a catalyst device comprises nano-scale nickel particles compressed volumetrically by between about 30% to about 75%.

In accordance with yet another embodiment, a method of manufacturing a catalyst device comprises volumetrically compressing a nano-scale nickel powder by between about 30% and 75%.

BRIEF DESCRIPTION OF THE DRAWINGS

FIG. 1 is a perspective view of a prior art fuel cell stack;

FIG. 2 is enlarged sectional view of a single fuel cell in the fuel cell stack of FIG. 1;

FIG. 3 illustrates a flow of hydrogen rich fuel into the fuel side of the fuel cell of FIG. 2 and a flow of air into the air side of the fuel cell of FIG. 2;

FIG. 4 illustrates a hydrogen rich fuel and air disposed on the fuel and air sides of the fuel cell of FIG. 2;

FIG. 5 illustrates the disassociation of the hydrogen fuel into electrons and protons in the fuel cell of FIG. 2;

FIG. 6 illustrates the movement of the protons from the fuel having traveled through the membrane electrode assembly and the movement of electrons along the anode of the membrane electrode assembly and toward a load device;

FIG. 7 illustrates the electrons from the anode returning to a cathode of the membrane electrode assembly after having traveled through a load device;

FIG. 8 illustrates the reassociation of the electrons with protons followed by their combining with a molecule of oxygen to form water on the air side of the fuel cell;

FIG. 9 illustrates the combined water molecules leaving the air side of the fuel cell.

Figure 10:
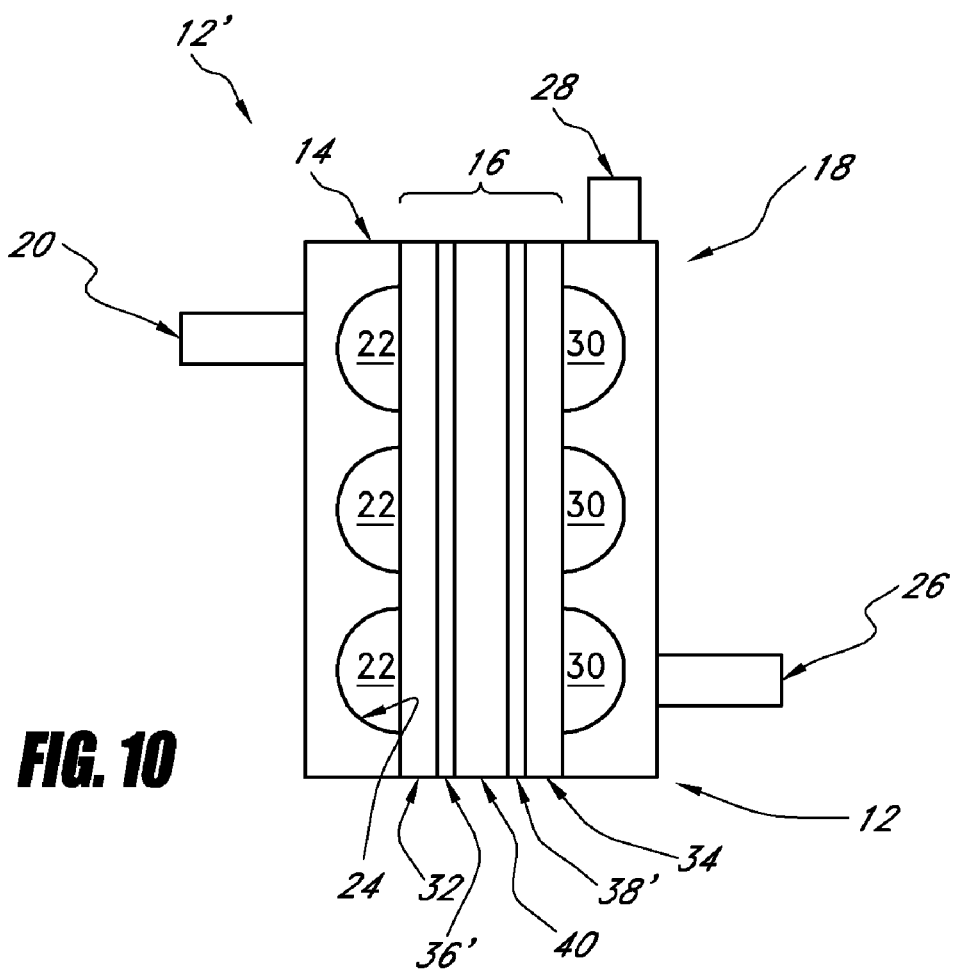

The features mentioned above in the summary of the invention, along with other features of the inventions disclosed herein, are described below with reference to the drawings of the preferred embodiments. The illustrated embodiments in the figures listed below are intended to illustrate, but not to limit the inventions. The drawings contain the following additional figures:

FIG. 10 is sectional view of a single fuel cell including a catalyst device constructed in accordance with one embodiment.

Figure 11:
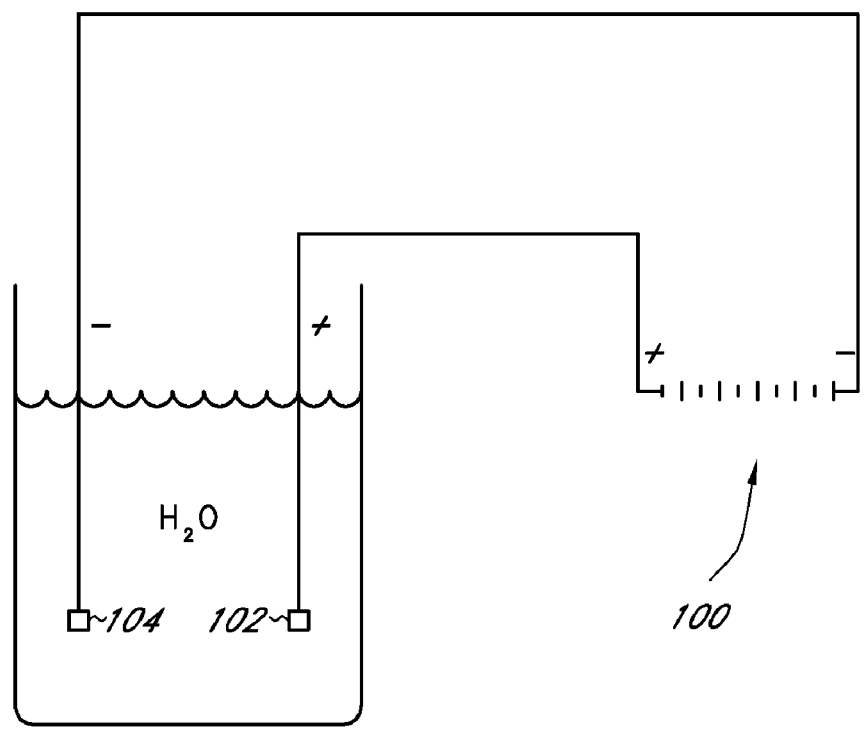

FIG. 11 is a schematic illustration of a device for performing electrolysis of water having catalysts devices constructed in accordance with another embodiment.

DETAILED DESCRIPTION OF THE PREFERRED EMBODIMENT

Devices which are configured to convert chemical energy into electrical energy are generally referred to as batteries. Fuel cells are a special class of batteries in which high-energy chemical reactants are continuously fed into the battery and the lower energy chemical products are continuously removed. However, fuel cells cannot store chemical energy like, for example, lead-acid batteries can.

Batteries can comprise one or several individual cells. A single cell includes a negative electrode and a positive electrode. An electrolytic solution separates the electrodes. When the cell is discharging (converting chemical energy to electrical energy), an oxidation reaction occurs at the negative electrode (anode). At the positive electrode (cathode), a reduction reaction occurs during discharging.

For the electrode reactions of any corresponding pair of anodes and cathodes (also known as an electrochemical couple), electrons pass from the anode, through an external circuit such as an electric motor or storage device, to the cathode. Completion of the circuit occurs when ionic species are transferred across the cell through the intervening electrolyte. The change from electronic conduction to ionic conduction occurs at the electrode and involves an electrochemical (Faradaic) reaction. However, electrons cannot pass through the electrolyte, or short circuiting will resort in cell self-discharge. An example of a known prior art hydrogen/air fuel cell is illustrated in FIGS. 1-9.

Figure 1:
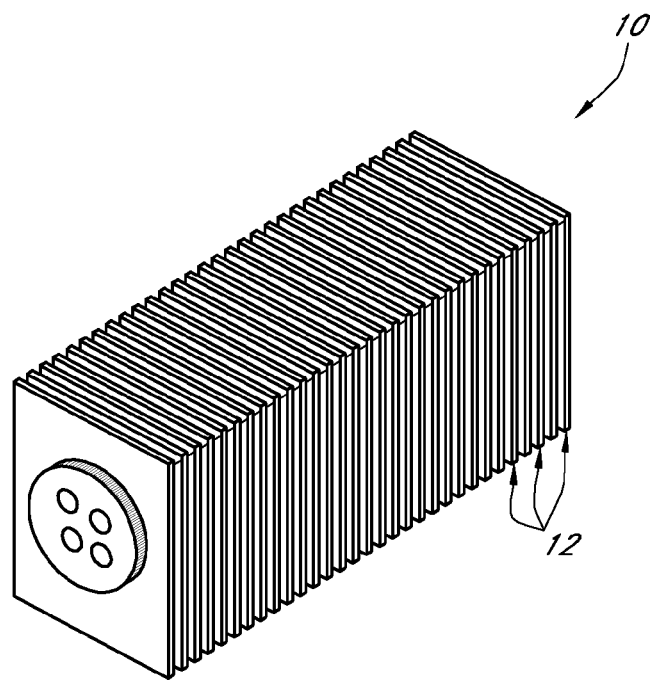
FIGS. 1-9 schematically illustrate prior art fuel cell systems.

As shown in FIG. 1, a fuel cell stack 10 is made up of the plurality of individual fuel cells 12. Each fuel cell can be comprised of a pair of plates and a membrane electrode assembly. One plate defines a flow area between an inner surface of the plate and one surface of the membrane electrode assembly (MEA) while the other plate defines a second flow area between the second plate and other side of the membrane electrode assembly. The two flow areas are separated from each other. Thus, fuel can be supplied to one of the flow areas and air, or another oxygen carrying medium, can be supplied to the other flow area.

Figure 2:
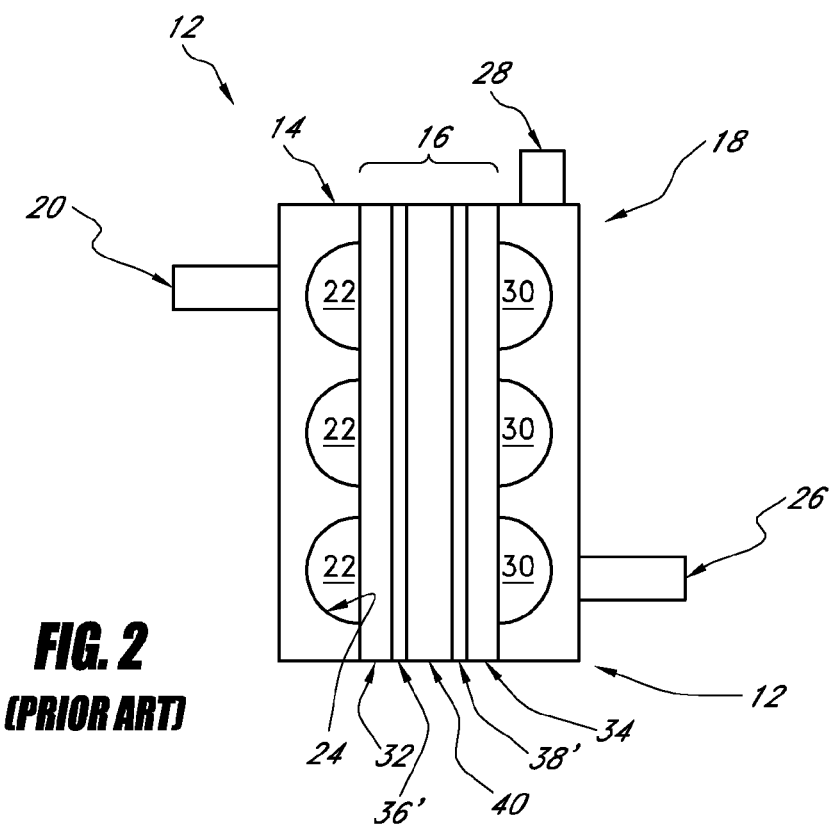

FIG. 2 illustrates an enlarged schematic sectional view of a single cell 12. Only a single cell is illustrated in FIG. 2 for simplicity. One of ordinary skill in the art understands how to use a plurality of the individual cells 12 to construct a fuel cell stack 10.

As shown in FIG. 2, the cell 12 includes a fuel-side plate 14, a membrane electrode assembly (MEA) 16 and air-side plate 18. The fuel-side plate 14 is typically constructed of machined graphite. The plate 14 defines a fuel inlet 20 and a fuel flow area 22. The fuel inlet 20 is connected to the fuel flow area 22. The fuel flow area 22 can be constructed from surface features on an inner surface 24 of the plate 14. For example, the fuel flow area 22 can be comprised of channels or other flow resistance or mixing features for generating a mixed and/or evenly spread flow of fuel through the flow area 22.

Plate 18 can be configured in a substantially similar or identical manner, depending on the type of fuel cell. In the illustrated example, the fuel cell stack 10 is configured to convert pure hydrogen gas into electricity through reaction with air. Thus, the plate 14 does not have an outlet for discharging material from the flow area 22. Rather, in this type of fuel cell, all of the supplied fuel is consumed.

However, the plate 18, because it is designed to receive air and to discharge the by products of the reaction, namely water and carbon dioxide ($CO_2$), includes an air inlet 26 and an exhaust outlet 28. Additionally, similarly to the flow area 22, the plate 18 also defines a flow area 30 which can be constructed generally in accordance with the description set forth above with respect to the flow area 22. Additionally, in prior art systems, plates such as the plates 14 and 18 have been formed from machined graphite.

The membrane electrode assembly 16 typically comprises two electrodes, for example, an anode 32 and a cathode 34. The anode 32 and the cathode 34 are disposed so as to be in contact with the fuel flowing in flow areas 22 and the air flowing in the flow areas 30, respectively. The MEA 16 also includes catalyst devices 36, 38 and a proton exchange membrane 40. The construction of these devices are well known in the art, however, a more detailed description is set forth below.

The anode 32 and the cathode 34 serve as the negative and positive electrodes, respectively. In operation, several processes are involved. The processes can be summarized as: gas transfer to reaction sites, electrochemical reaction at those sites, the transfer of ions and electrons, and their recombination at the cathode.

In some designs, gas is diffused through the electrode leaving behind any impurities which may disrupt the reaction. Gases move toward the reaction sites within the catalyst device 36 based on the concentration gradient between the fuel flow areas 22 (high concentration) and the reaction sites (low concentration). Platinum, which is typically used as the catalyst in the catalyst members 36, 38, cooperates with the electrode members 32, 34 and can thus together serve as the electrodes. Thus, the catalyst member 36 and the electrode member 32 can be considered a single member depending on the construction used. For example, because platinum is a conductive metal, the catalyst member 36 can be electrically connected with wires and thus serve as an electrode itself. In some embodiments, the platinum is supported by supporting structures, such as, for example, but without limitation, graphite or other conductive members which are connected to wires for completing an electric circuit.

The concentration gradient noted above refers to the difference between the concentration of free flowing gas in the flow areas 22, 30 and the concentration at the reaction sites in the catalyst. This gradient varies depending on pressure and temperature of the gases and the diffusion coefficient of the electrode material. When gas comes near the reaction sites, the flow is dominated by a capillary action based on the reaction rates at the sites.

Two main electrochemical reactions occur in a fuel cell; one at the anode 32, 36 and the other at the cathode 34, 38. At the anode 32, 36, and more particularly, in the catalyst member 36, hydrogen gas molecules are dissociated into (positively charged) hydrogen ions and electrons ($H_2 \leftrightarrows 2H^+ + 2e^-$). This occurs when hydrogen fuel enters a reaction site within the catalyst member 36 and is broken into ions and electrons. The resulting ions ($H^+$) form bonds with the catalyst surface while electrons ($e^-$) remain near the ions until another fuel molecule begins to react with the catalyst 36, thus breaking the bond with the ion.

The number of reaction sites within a catalyst, such as the platinum catalyst member 36, are generally determined by the surface energy density of the catalyst material and the total amount of surface area of the catalyst material. For example, the number of reaction sites of a catalyst device is roughly proportional to the surface energy density times the total surface area. A reaction site can be considered to be a point or area on the surface of the catalyst material that has sufficient surface energy available to break a hydrogen molecule into hydrogen ions and electrons.

With reference again to the reaction occurring at the catalyst member 36, this reaction releases hydrogen ions and electrons whose transport is crucial to energy production. The ions build up on the anode 32, 36 creating a positive potential which pushes the outer ions away from the anode 32, 36. The ions transfer through the electrolyte of the membrane 40 either by remaining connected to or an attraction to a water molecule which travels through the membrane 40, or by transferring between water molecules. The oxygen side of the water molecules contain a slight negative charge which attracts the positively charged hydrogen ions and may become attached to them, but the attraction is weak so any bonds formed are easily broken. The actual method of transfer varies, but is based on the thickness of the membrane 40, the amount of water in the membrane 40 and the number of ions transported. Thus, the anode 32, 36 contains a net positive charge while the cathode 34, 38 towards which the ions drift, contains a negative potential.

At the catalyst member 38, the hydrogen ions are recombined with electrons that have flowed from the anode and across a load as well as with oxygen ($2H^+ + 1/2O_2 + 2e^- \leftrightarrows H_2O$). Oxygen molecules, usually from atmospheric air, are broken up into their components by the catalyst member 38. The resulting water is ejected into the gas channel and out of the cell 12.

Figure 3:
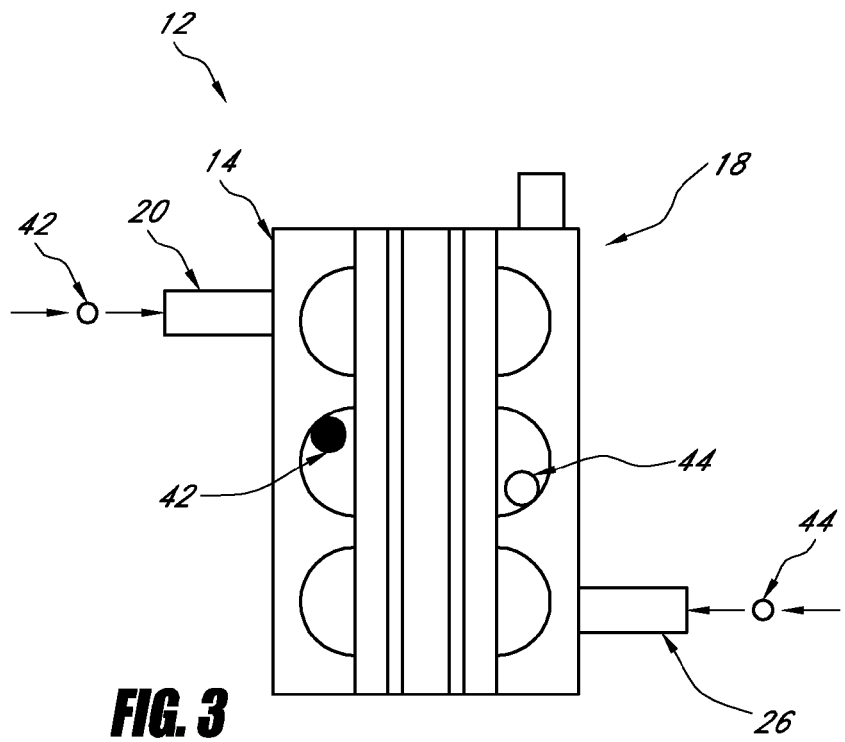
Figure 4:
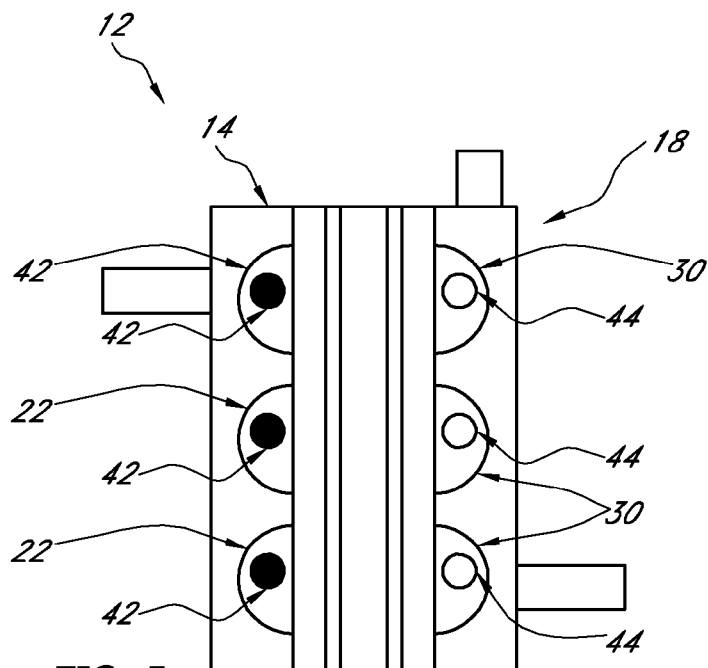

FIGS. 3 and 4 schematically illustrate the flow of hydrogen molecules 42 flowing into the flow areas 22 as well as the flow of air molecules, and in particular oxygen 44, flowing into the flow areas 30.

Figure 5:
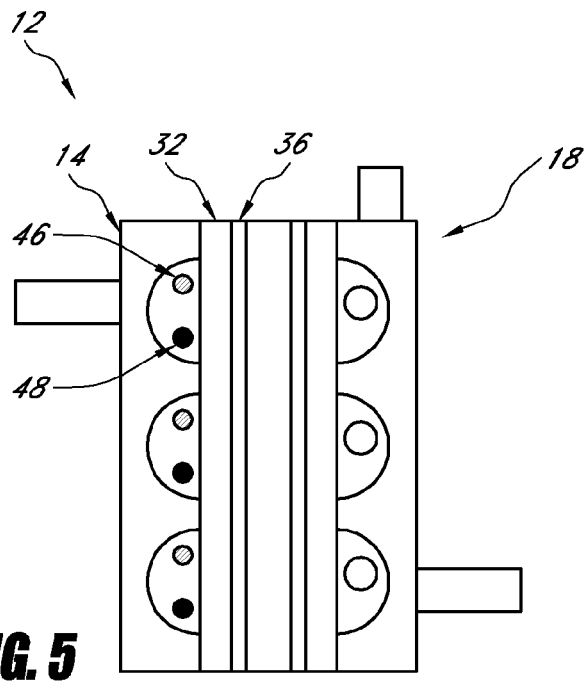

With reference to FIG. 5, the disassociation of electrons 46 from the protons 48 forming the previously introduced hydrogen molecule 42 (FIG. 4) is schematically illustrated. This dissociation occurs at reaction sites in the catalyst member 36. When the hydrogen molecules 42 reach the reaction sites within the catalyst 36, hydrogen molecules ($H_2$) disassociate so as to form two hydrogen ions ($2H^+$) 48 and two electrons ($2e^-$) 46.

Figure 6:
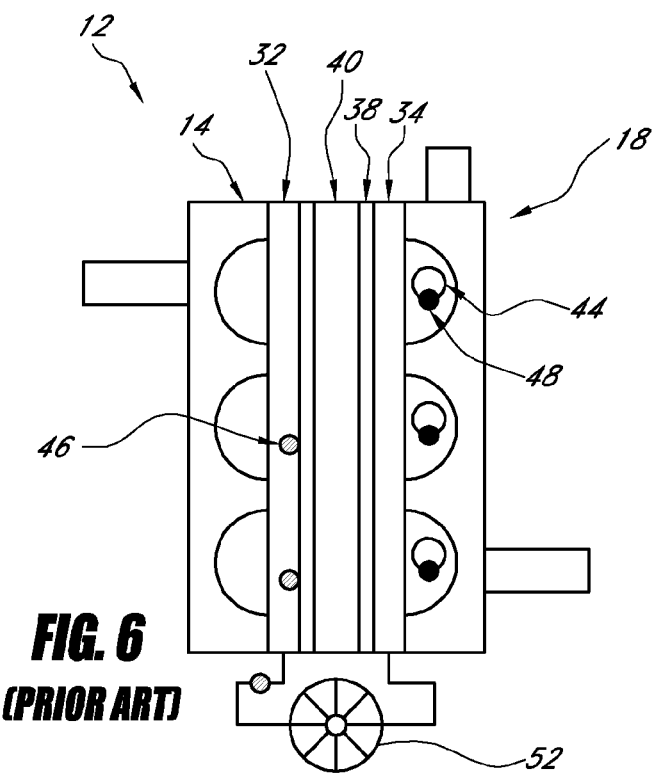

With reference to FIG. 6, the proton exchange membrane 40 allows the hydrogen ions 48 to pass therethrough, however, inhibits the electrons 46 from passing therethrough. The buildup of electrons 46 in the anode 32 generates a net negative charge at the anode.

Figure 7:
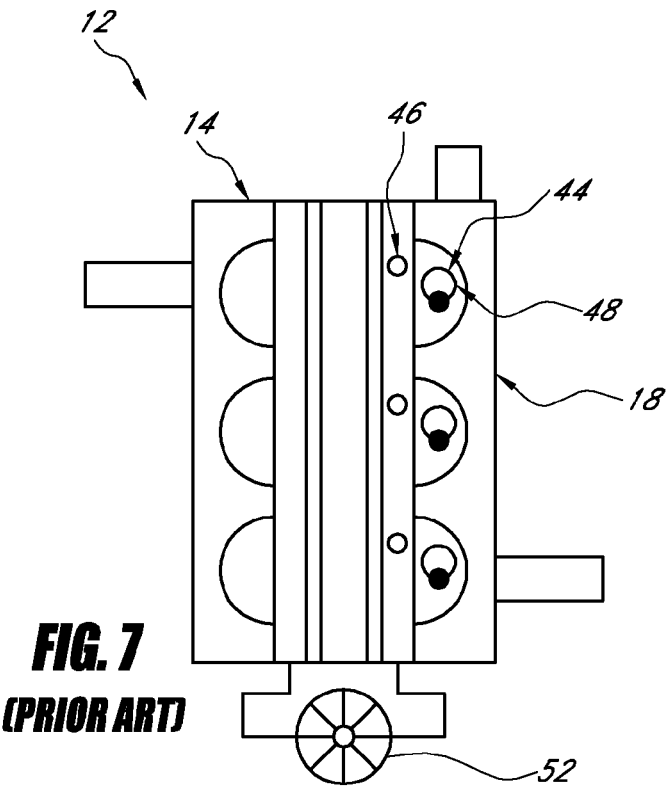
Figure 8:
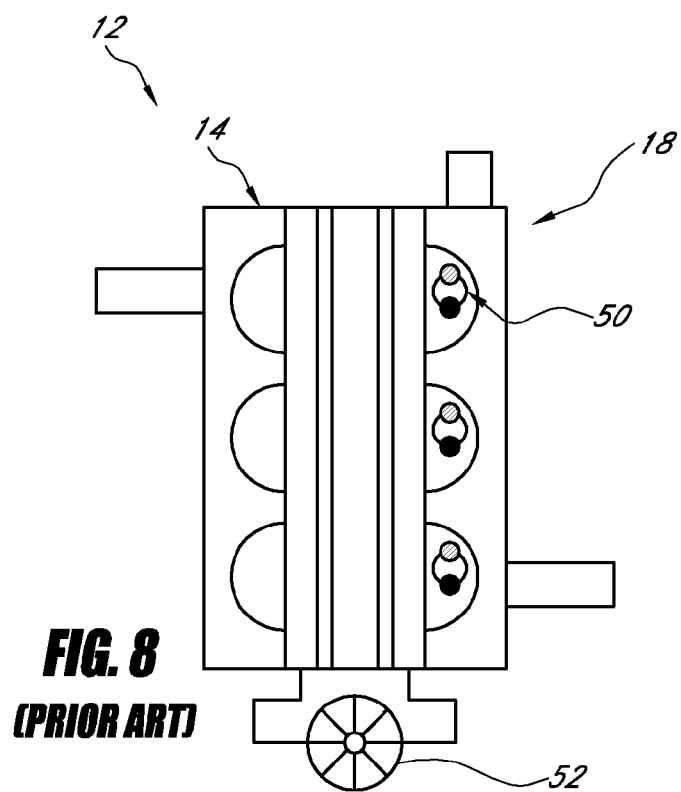

Additionally, as shown in FIG. 7. at the reaction sites in the catalyst member 38, the hydrogen ions ($H^+$) 48 combine with oxygen molecules 44 and recombine with electrons 46 returning from the load device 52 to form water ($H_2O$) 50 (FIG. 8).

Figure 9:
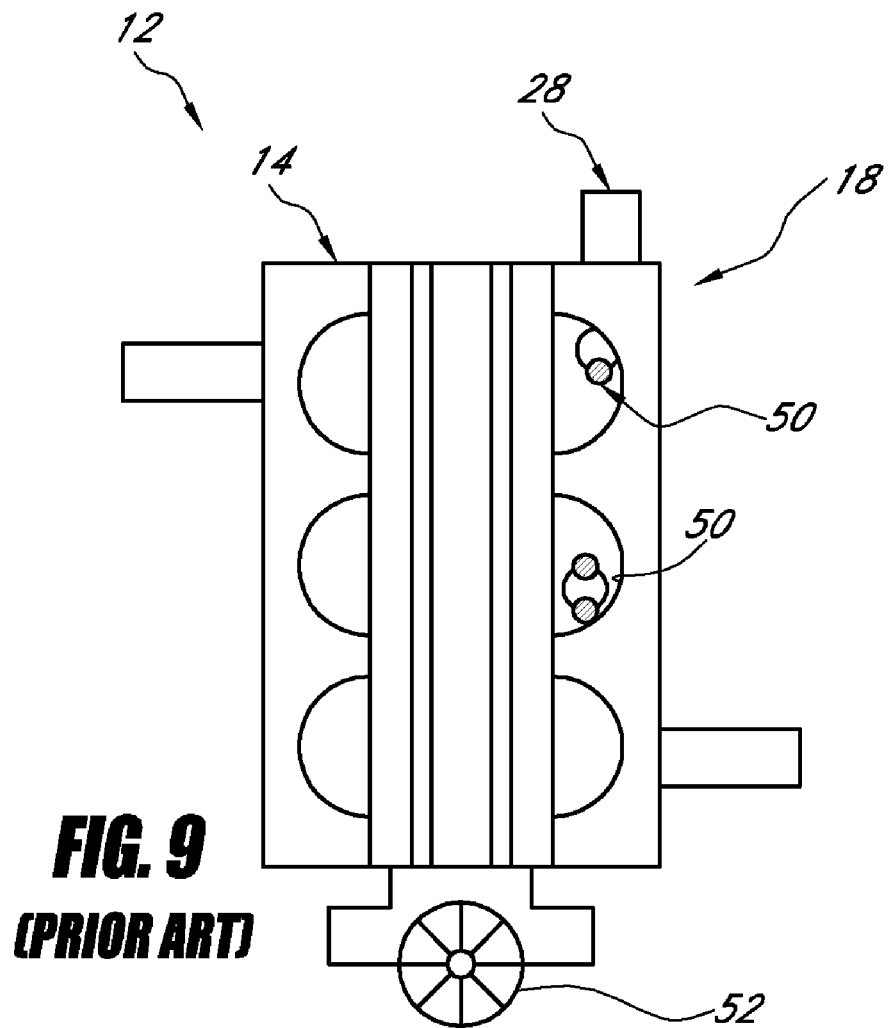

With continued reference to FIG. 6, the movement of the electrons 46 from the anode 32 to the cathode 34 can be applied to a load device, such as, for example, but without limitation, an electric motor 52. The electrons 46 are drawn to the cathode 34 due to the positive charge on the hydrogen ions 48. FIG. 9 illustrates the discharge of the water molecules through the exhaust outlet 28.

As noted above, typically platinum is the main component of catalyst members used in fuel cell systems. However, platinum is relatively expensive and is one factor in preventing the widespread use of such fuel cell systems.

An aspect of at least one of the embodiments disclosed herein includes the realization that nickel (Ni) can be configured to have a surface energy sufficiently high to replace platinum commonly used in the catalyst members of modern hydrogen fuel cell systems. For example, although nickel generally has a lower surface energy density than that of platinum, nickel can be formed into a nano-scale particle. As such, a nano-scale particle of nickel can have an exponentially higher surface area-to-volume ratio than that of a micon-scale platinum particle. Thus, a catalyst member, such as the catalyst members 36 and 38 can be formed from nano-scale nickel particles and provide a sufficient number of reaction sites so as to perform about the same as a platinum catalyst device.

The increased surface energy of nano particles compared to micron sized particles is due to the very large number of atoms on the surface of nano materials. As an example, 3 nanometer aluminum particles can be considered as tiny cubes. As such, they would have ten atoms on each edge, about one thousand atoms in total. Of those thousand atoms, 488 would be on the surface and 512 in the interior of the particle. That means that roughly half of the particles would have the energy of bulk material and half would have higher energy due to the absence of neighboring atoms (aluminum atoms in the bulk material have twelve nearest neighbors while those on the surface have nine or fewer.) A 3 micron cube of aluminum would have 10,000 atoms along each edge for a total of one trillion atoms. There would be 999.4 billion of those atoms in the bulk (lower energy interior) material. That means that only 0.06% of the atoms would be on the surface of the 3 micron sized material compared to 48.8% of the atoms at the surface of the 3 nanometer aluminum particles.

The chemical kinetics of catalysts generally depend on the reaction of surface atoms. Having more surface atoms available will increase the rate of many chemical reactions such as combustion (oxidation) and adsorption. Extremely short diffusion paths (5 atoms from the particle center to the edge in the 3 nanometer particles) allow for fast transport of atoms through and into the particles for other processes. These properties give nano materials unique characteristics that are unlike those of corresponding conventional (micron and larger) materials.

FIG. 10 illustrates a fuel cell 12' having nano-scale nickel particle catalyst devices. The fuel cell 12' of FIG. 10 includes the same or similar components of the fuel cell 12 which are identified with the same reference numerals used to identify those components of the fuel cell 12, except that a "'" has been added thereto. Additionally, those components that can be constructed in the same or similar manner are not described in further detail The catalyst members 36', 38' can be formed from nano scale particles of nickel. For example, the catalyst members 36', 38' can be formed of powderized nickel having a particle size on the nano-scale, e.g., from about 1 to 100 nanometers (nm). In some embodiments, the particle size can be less than about 100 nm. In some embodiments, the particles can be between about 10 and 80 nm. In some embodiments, the nickel particles can be in the range of about 10 to 20 nm.

The nickel particles can be formed through any known manufacturing technique, including, for example, but without limitation, ball milling, precipitation, vaporization-quenching techniques such as joule heating, plasma torch synthesis, combustion flame, exploding wires, spark erosion, ion collision, laser ablation and electron beam evaporation. Another possible technique includes feeding a material onto a heater element so as to vaporize the material, allowing the material vapor to flow upwardly from the heater element in a laminar manner under free convection, injecting a flow of cooling gas upwardly from a position below the heater element, preferably parallel to and into contact with the upward flow of the vaporized material and at the same velocity as the vaporized material, allowing the cooling gas and vaporized material to rise and mix sufficiently long enough to allow nano-scale particles of the material to condense out of the vapor, and drawing the mixed flow of cooling gas and nano-scale particles with a vacuum into a storage chamber. This latter manufacturing process is described in co-pending U.S. patent application Ser. No. 10/840,409, 10/810,109, filed May 6, 2004, the entire contents of which is hereby expressly incorporated by reference.

The nano-scale nickel particles can be formed into a plate shape with any known technique, including, for example, but without limitation, sintering, cold working, etc.

Where the nano-scale nickel powder is sintered, in some embodiments, the powder can be compressed, volumetrically by about 30 to 75%. In some embodiments, the powder can be compressed, volumetrically by about 40 to 60%. In some embodiments, the powder can be compressed, volumetrically, by about 50%. In the sintering process, the particles will be urged into electrical contact with each other, while leaving interstitial pores thereby allowing conduction of electrons through the plate as well as allowing gas and vapor molecules to pass through the pores.

Preferably, the compression of the powder is sufficient to provide continuous electrical pathways substantially throughout the resulting plate of nickel particles. Additionally, it is preferable that the compression does not completely close off the pores so as to ensure that water, water vapor, hydrogen molecules, hydrogen ions, as well as other molecules can pass through the catalyst member 36' and into the membrane 40.

In some embodiments, the manufacturing process can also include heating, as is commonly used in known sintering techniques. However, the heating of the nickel particles should be limited so as to not allow excessive grain growth. For example, if the nickel particles are heated excessively, thereby causing excessive grain growth, the particles combine to form larger particles. This growth reduces the surface area to volume ratio of the particles, and thereby reduces the number of reaction sites available for catalytic functions. One of ordinary skill in the art will recognize that any sintering process is likely to produce some grain growth, and thus it is anticipated that the resulting catalyst members 36', 38' will include grains that have grown larger than the original nickel particles, including grain sizes that are larger than "nanoscale". However, it is preferable to optimize the pressure and heating of the particles during the sintering process to preserve the nano-scale size of the original particles and yet form a plate member that is structurally stable.

In some embodiments, the sintering process can include placing nano-scale nickel particles, either alone or with additional alloying particles, into a mold and compressing the particles under high pressure to a near net shape "green" compact.

The green compact can be sintered to a porous membrane by furnace heating and quenching. This method can be performed quickly, inexpensively, and requires commonly available equipment. Additionally, there are few restrictions on the size and shape of the finished product.

Optionally, the method of manufacturing can include sealing the green compact in a nickel can and consolidated by hot isostatically pressing (HIP). Following HIPing the outer nickel can be removed using electrostatic discharge machining (EDM) techniques. The HIP process provides further advantages in that temperature, atmosphere and thus grain growth can be better controlled.

In some embodiments, the method of manufacturing can be performed by compaction plasma sintering of the nickel particles. For example, but without limitation, a machine currently commercially available under the trade name Dr. Sinter® from the Sumitomo Coal Company can be used to perform such a process. Such rapid sintering provides a further enhancement of grain growth control. For example, such a process can achieve a satisfactory sintering of the nickel particles in a period of seconds, thereby providing better grain growth control.

As noted above, the final size and shape of the catalyst device 36', 38' can be obtained by cutting using the EDM process. Although other machining techniques can also be used, the EDM process provides a further advantage in that pores in the resulting sintered member are better preserved.

After the sintered members are machined or otherwise formed into their final shape, they can be installed into the fuel cell 12' so as to serve as the catalyst members 36', 38' or as combined catalyst and electrode members.

Optionally, the sintered members can include other materials. For example, but without limitation, aluminum can be added to the nano-scale nickel particles prior to sintering. In some embodiments, nano-scale aluminum powder can be mixed with the nano-scale nickel powder to form a mixture of about 80% nickel and 20% aluminum by weight. However, other materials and other proportions can also be used.

In some embodiments, the catalyst members 36', 38' can include silver particles. The effects of silver in this type of catalyst device are well known, and are not repeated herein. In some embodiments, the silver particles can be nano-scale particles. For example, the silver particles can be less than about 100 nm, between about 1 and 100 nm, between about 10 and 80 nm, and/or between about 10 to 20 nm. Such silver particles can be mixed with any of the sizes of nickel particles noted above. In such nickel and silver particle embodiments, the catalyst members 36', 38' can be formed of about 80-95% nickel particles and 5-20% silver particles. In some embodiments, the catalyst members 36', 38' can be formed of about 90-95% nickel particles and 5-10% silver particles.

Additionally, in some embodiments, the catalyst members 36', 38' can include aluminum and silver particles. For example, the catalyst members 36', 38' can include any combination of the above noted proportions of aluminum and silver, with the remainder being nickel particles.

In some embodiments, the catalyst members 36', 38' can also include ruthenium particles, which are commonly used in catalysts exposed to sulfur and oxides of carbon. The effects of ruthenium in this type of catalyst device are well known, and are not repeated herein. In some embodiments, the ruthenium particles can be nano-scale particles. For example, the ruthenium particles can be less than about 100 nm, between about 1 and 100 nm, between about 10 and 80 nm, and/or between about 10 to 20 nm. Such ruthenium particles can be mixed with any of the sizes of nickel particles noted above. In such nickel and ruthenium particle embodiments, the catalyst members 36', 38' can be formed of about 85-99% nickel particles and 1-15% ruthenium particles.

Additionally, in some embodiments, the catalyst members 36', 38' can include aluminum and ruthenium particles. For example, the catalyst members 36', 38' can include any combination of the above noted proportions of aluminum and ruthenium particles, with the remainder being nickel particles. Finally, such aluminum and ruthenium particle catalyst members 36', 38' can include silver as well. For example, the catalyst members 36', 38' can include any combination of the above noted proportions of aluminum, ruthenium, and silver particles, with the remainder being nickel particles.

The nickel, aluminum particles, silver, and ruthenium can have various shapes. For example, some nano-particle manufacturing techniques generate particles with generally cubic or partially-crystalline shapes while others produce particles that are more spherical. Thus, although the sizes of particles can be expressed as a diameter, the term diameter is not intended to require that the particle is spherical. Rather, where the term diameter is used, it is intended to apply to any shape particle. Thus, a cubic or crystalline-shaped particle can be measured by placing an imaginary sphere over the particle so as to define a diameter of the particle.

Further, after such particles have been sintered, particles can be fused to adjacent particles. Thus, it is intended that the size of the particle in a sintered member refers to the surfaces of the particle that are not fused to an adjacent particle. Thus, in a manner similar to that noted above, an imaginary sphere can be used to approximate the size of a particle that has been fused or sintered to an adjacent particle.

In accordance with another embodiment, the same manufacturing processes noted above can be used to form catalysts for the electrolysis of water. With reference to FIG. 11, the basic electrolysis of water process is well known in the art. In this process, energy from an electrical source, such as a battery 100, is used to dissociate water ($H_2O$) into the diatomic molecules of hydrogen ($H_2$) and oxygen ($O_2$). In this basic example, two different dissociation reactions occur.

At the anode 102, water is oxidized ($2H_2O \rightarrow O_2 + 4H^+ + 4e^-$). On the other hand, at the cathode 104, water is reduced ($4H_2O + 4e^- \rightarrow 2H_2 + 4OH^-$). Thus, bubbles of oxygen gas ($O_2$) form at the anode 102, and bubbles of hydrogen gas ($H_2$) form at the cathode 104.

Typically, where higher levels of electrical efficiency are desired, the electrodes 102, 104 are composed of platinum or platinum coated probes. As noted above with respect to the catalyst devices 36, 38, the platinum enhances the reaction rates due to the high surface energy provided by the platinum.

In accordance with at least one embodiment, the electrodes 102, 104 can be formed of nano-scale nickel particles, thereby providing a catalytic effect similar to that of a platinum probe. In some embodiments, the electrodes 102, 104 can be manufactured in accordance with the methods of manufacturing noted above with respect to the embodiment of FIG. 11. Thus, a further description of those methods will not be repeated.

Of course, the foregoing description is that of preferred embodiments having certain features, aspects, and advantages in accordance with the present inventions. Various changes and modifications also may be made to the above-described embodiments without departing from the spirit and scope of the inventions.

What is claimed is:

1. An electrode configured for use in electrochemical applications, the electrode consisting of a uniform mixture of catalytic nano-sized material sintered to form a solid compact.

2. A fuel cell configured to generate electrical energy from reactions of a gaseous fuel, the fuel cell comprising the electrode of claim 1 and a proton exchange membrane.

3. The electrode of claim 1, wherein the nano-scale reactive metal particles are selected from the group consisting of metals from groups 3-16, lanthanides, combinations thereof, alloys thereof, and oxides thereof.

* * * * *